(12) United States Patent
Wuerth et al.

(10) Patent No.: US 9,205,789 B2
(45) Date of Patent: Dec. 8, 2015

(54) METHOD FOR MONITORING VEHICLE SYSTEMS DURING MAINTENANCE WORK ON THE VEHICLE

(75) Inventors: Gebhard Wuerth, Sulzbach-Laufen (DE); Michael Kunz, Steinheim an der Murr (DE); Ralf Kinder, Backnang (DE); Thilo Stephan, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 533 days.

(21) Appl. No.: 13/581,065

(22) PCT Filed: Jan. 11, 2011

(86) PCT No.: PCT/EP2011/050257
§ 371 (c)(1),
(2), (4) Date: Nov. 16, 2012

(87) PCT Pub. No.: WO2011/104048
PCT Pub. Date: Sep. 1, 2011

(65) Prior Publication Data
US 2013/0054081 A1 Feb. 28, 2013

(30) Foreign Application Priority Data

Feb. 25, 2010 (DE) .......................... 10 2010 002 328

(51) Int. Cl.
*B60R 16/023* (2006.01)
*G07C 5/00* (2006.01)
*B60W 50/00* (2006.01)
*B60W 50/04* (2006.01)
*G01M 17/007* (2006.01)

(52) U.S. Cl.
CPC ........ *B60R 16/0232* (2013.01); *B60W 50/0098* (2013.01); *G07C 5/006* (2013.01); *B60T 2270/406* (2013.01); *B60W 50/045* (2013.01); *G01M 17/007* (2013.01)

(58) Field of Classification Search
CPC .......................... G07C 5/006; B60T 2270/406
USPC ........... 701/29.4, 31.7, 33.6, 33.7, 33.8, 33.9, 701/34.1
See application file for complete search history.

(56) References Cited

U.S. PATENT DOCUMENTS

| 5,067,099 | A  | * | 11/1991 | McCown et al. | ............. 702/183 |
| 6,282,469 | B1 | * | 8/2001  | Rogers et al. | ............. 701/34.3 |
| 6,289,271 | B1 | * | 9/2001  | Isono et al.  | ............. 701/34.4 |
| 6,405,111 | B2 | * | 6/2002  | Rogers et al. | ............. 701/34.3 |

(Continued)

FOREIGN PATENT DOCUMENTS

| CN | 102521935 | 6/2012 |
| EP | 1 524 628 | 4/2005 |

(Continued)

*Primary Examiner* — Tuan C. To
*Assistant Examiner* — Dale W Hilgendorf
(74) *Attorney, Agent, or Firm* — Kenyon & Kenyon LLP

(57) ABSTRACT

A method for avoiding error messages due to maintenance work on a vehicle, which are generated by a monitoring unit if one or multiple operating parameters of a monitored vehicle system are outside of a predefined, admissible value range. Accordingly, the general driving operation is monitored with the aid of a vehicle's own sensor system with respect to a maintenance state and, if a maintenance state is established, the admissible value range be automatically extended or at least one operating parameter is ignored during monitoring.

10 Claims, 1 Drawing Sheet

(56) References Cited

U.S. PATENT DOCUMENTS

| | | | |
|---|---|---|---|
| 7,236,862 B2 * | 6/2007 | Kanno | 701/31.5 |
| 7,765,042 B2 * | 7/2010 | Foerstner et al. | 701/33.6 |
| 2004/0068353 A1 * | 4/2004 | Momiyama et al. | 701/41 |
| 2004/0254696 A1 * | 12/2004 | Foerstner et al. | 701/29 |
| 2010/0023207 A1 * | 1/2010 | Maeda et al. | 701/35 |
| 2012/0150380 A1 * | 6/2012 | Whittaker | 701/29.4 |

FOREIGN PATENT DOCUMENTS

| | | |
|---|---|---|
| JP | 2009-154721 | 7/2009 |
| WO | 00/56574 | 9/2000 |
| WO | WO 2008123145 A1 * | 10/2008 |

* cited by examiner

METHOD FOR MONITORING VEHICLE SYSTEMS DURING MAINTENANCE WORK ON THE VEHICLE

FIELD OF THE INVENTION

The exemplary embodiments and/or exemplary methods of the present invention relate to a method for monitoring vehicle systems during maintenance work on the vehicle, and in particular a method for avoiding error messages due to maintenance work.

BACKGROUND INFORMATION

In modern vehicles, safety-relevant vehicle systems, in particular, are continuously monitored for their reliability performance. Thus, for example, in the case of an electrically actuated brake system (brake-by-wire brake system), the path of a brake piston and the related brake pressure profile are monitored. If one of the above-mentioned operating parameters is outside an admissible value range or the relationship between the two operating parameters is no longer plausible, an error message is generated and the error may be displayed acoustically or visually. Monitoring is usually performed with the aid of a sensor system and of software which is stored in a control unit.

In the event of maintenance work on the vehicle, for example, on a brake system, operating states of individual components often occur which are outside a standard range and are therefore classified as errors by the monitoring unit. Thus, for example, after a brake lining change, the brake pistons are typically pushed back very far into the brake caliper, so that when the service brakes are actuated, the braking force builds up on the wheel brakes only with a great delay. This is detected as an error by the monitoring unit. However, this is not desirable in the case of maintenance work.

To avoid such error messages during or after the maintenance work, specially adapted diagnostic routines were therefore introduced, which support the maintenance work and should prevent an undesirable response of the monitoring units. However, these diagnostic routines are often not available to small, independent repair shops or do-it-yourself mechanics. In this case, performance of the maintenance work often results in a response of the monitoring unit.

When certain maintenance work is performed other approaches provide for automatic routines which support the repair-shop personnel when performing the maintenance work and are supposed to prevent the system monitoring from responding. Thus, for example, it may be provided that the brake pistons automatically move into a front position after a brake lining change. However, undesired activation of these automatic routines during normal operation may be safety-critical. Therefore, the automatic routines must be activated by the repair-shop personnel on the basis of a precisely defined sequence plan. This is, however, relatively complicated for the repair-shop personnel, so that the supporting routines are often not used.

SUMMARY OF THE INVENTION

It is therefore an object of the exemplary embodiments and/or exemplary methods of the present invention to provide a method for monitoring a vehicle system which avoids error messages during maintenance work and, in particular, requires no additional routines.

This object may be achieved according to the exemplary embodiments and/or exemplary methods of the present invention by the features described herein. Further embodiments of the present invention are also described herein.

According to the exemplary embodiments and/or exemplary methods of the present invention, the general operating state of a vehicle is monitored by sensors and it is established whether the vehicle is in a maintenance state. If a maintenance state has been established, the admissible value range for one or multiple operating parameters of the monitored vehicle system is extended or the error latency time is increased for at least one operating parameter. The error latency time is a time period stored in the system which may let the monitored operating parameter be outside the predefined value range without an error message being generated. The monitoring system is thus set to be less sensitive and does not generate an error message until the operating parameter(s) exceed(s) the extended value range or remain(s) outside the admissible value range for a time period that is longer than the error latency time.

During the driving operation of a vehicle, driving states may occur which resemble a maintenance state. In this case, a maintenance state is erroneously detected. In order to ensure sufficient safety even in the case of such an erroneous detection, the admissible value range may not be extended excessively.

A suitable sensor system is provided for monitoring the vehicle operation with respect to maintenance work. In addition to different vehicle's own sensors, which are installed in most vehicles as standard, the sensor system may also have sensors directly coupled to the system to be monitored. According to a specific embodiment of the present invention, a maintenance state is monitored with the aid of a wheel speed sensor, a gear position sensor, or an engine speed sensor or of any combination of these sensors. More or fewer or other sensors may optionally also be provided.

If the service brake system is monitored, the monitored operating parameters may include a brake pressure, a brake piston path, and/or a pump run time of a hydraulic pump.

The monitoring unit may basically check whether one or multiple operating parameters are within or outside a particular predefined value range or whether or not the mutual relationship of several operating parameters is plausible. Thus, for example, it may be monitored whether a certain brake piston path results in a certain pressure buildup and whether the particular values are plausible in relation to each other.

According to one specific embodiment of the present invention, as soon as a maintenance state has been established, at least one threshold value, which represents a limit of an admissible value range, is modified in such a way that the value range is extended. Optionally or additionally, the error latency time may also be increased.

A maintenance state may be detected when several predefined conditions are met, for example, when the internal combustion engine is turned off, the vehicle is held mechanically, and the vehicle speed is equal to 0 km/h. In this case, the value range of at least one monitored operating parameter is extended or at least one operating parameter is ignored during monitoring. If one of the predefined conditions is not or is no longer met, the value range may be reset to the normal state or the parameter is monitored again. The number and type of conditions may be predefined as desired.

The exemplary embodiments and/or exemplary methods of the present invention are described in greater detail below on the basis of the attached drawings as an example.

DETAILED DESCRIPTION

Figure 1:
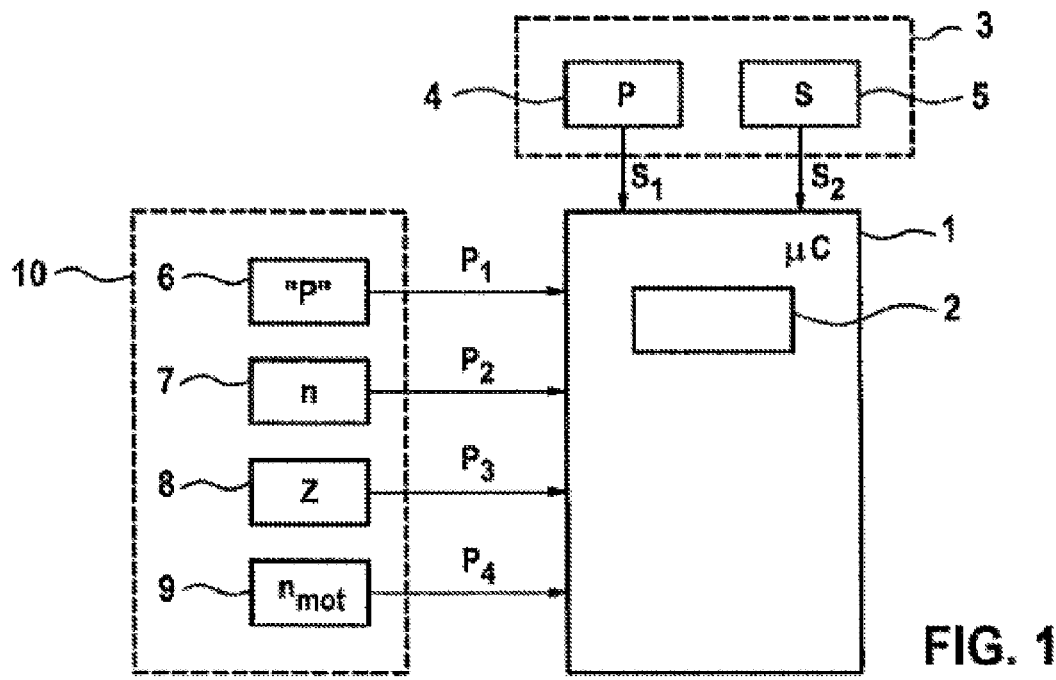
FIG. 1 shows a schematic block diagram of a system for monitoring the reliability performance of the motor vehicle brake system.

FIG. 1 shows a schematic block diagram of a system for monitoring a hydraulic motor vehicle brake system 3. The illustrated system includes a monitoring unit 1, such as a control unit having an appropriate algorithm 2.

Multiple sensors 6 through 9, with the aid of which a maintenance state may be detected, are connected to monitoring unit 1. In the illustrated exemplary embodiment, the sensors are gear position sensor 6, which detects at least the parking position "P" in automatic vehicles, a wheel speed sensor 7, the ignition switch 8, and an engine speed sensor 9. The sensors are collectively identified by reference numeral 10. Related sensor signals $P_1$ through $P_4$ are transmitted to monitoring unit 1. When the gear lever is in the "P" position, the vehicle speed is equal to 0 km/h, and ignition is off, a maintenance state is detected. If only one of the conditions is not met, a normal driving operation is assumed. Optionally also more or fewer sensors or also other sensors may be used for detecting a maintenance state.

To monitor the reliability performance of motor vehicle brake system 3 in ongoing driving operation, monitoring unit 1 inputs hydraulic brake pressure p and the piston path of the brake piston (signals $S_1$ and $S_2$). The corresponding values are supplied by related sensors 4 and 5, which are also connected to monitoring unit 1. Monitoring unit 1 checks whether mentioned values $S_1$, $S_2$ are within a particular predefined admissible value range. If one of the values is outside the predefined value range, an error message is generated. To prevent this from happening during maintenance work on the vehicle, the particular predefined value range is extended in the case of maintenance work. Undesirable error entries in the on-board computer of the vehicle or warning messages to the driver may thus be avoided.

Figure 2:
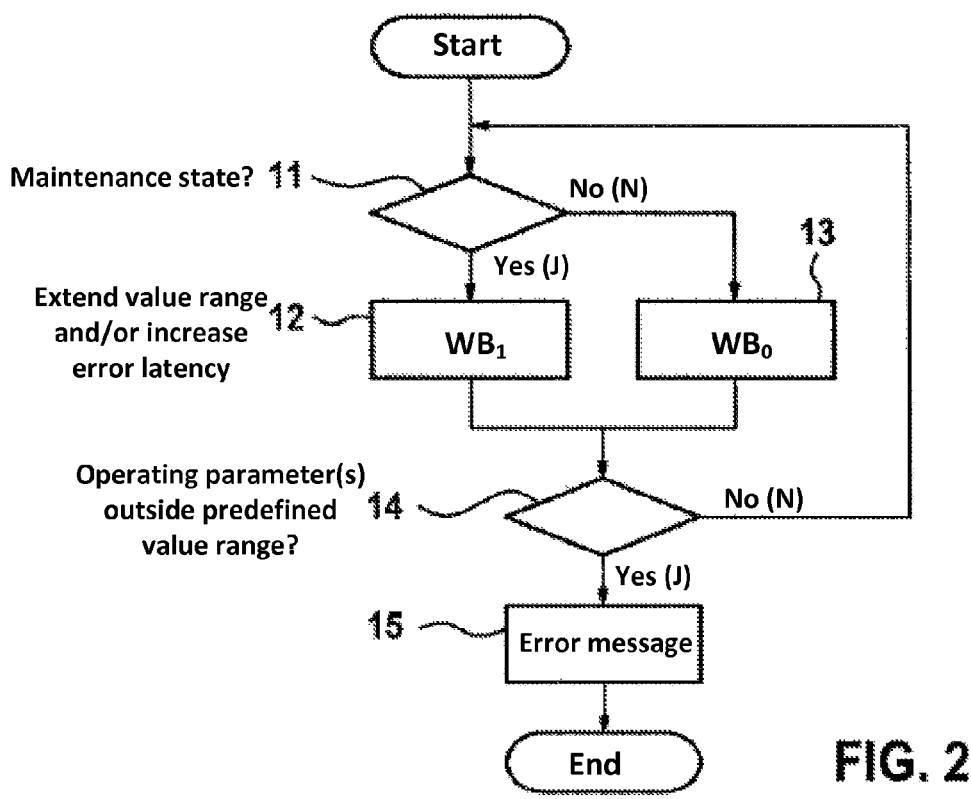
FIG. 2 shows a flow chart for illustrating some method steps in monitoring the function of the motor vehicle brake system.

FIG. 2 shows the essential method steps using the example of monitoring motor vehicle brake system 3. In step 11, a check is initially made with the aid of sensor system 10 of whether the vehicle is in a maintenance state. If so (J), the value range is extended for at least one of the monitored operating parameters in step 12, or the error latency time is increased for at least one of the monitored operating parameters. If the vehicle is in a normal driving state (case N), a standard setting $WB_0$ is kept for the value range as illustrated in step 13.

In step 14, one or more operating parameters of brake system 3 is/are monitored. The monitored operating parameters may be the brake pressure, a pump run time, or a piston path, for example. A plausibility check may also be performed in step 14. If one of the monitored operating parameters is outside the predefined value range (case J), in step 15, an error message is output to the driver and an error is entered into the on-board computer of the vehicle. If the monitored operating parameters are within the predefined value range (case N) the method branches back to Start. Since, in the case of maintenance work, value range $WB_1$ is much greater than in normal driving operation, undesirable error messages may usually be avoided.

What is claimed is:

1. A method for avoiding error messages due to maintenance work on a vehicle, the method comprising:
   detecting, using a sensor system, whether the vehicle is in a maintenance state, wherein a monitoring unit for monitoring a reliability performance of a vehicle system generates the error messages when one or multiple operating parameters of the vehicle system are outside a predefined admissible value range, and wherein the monitoring unit generates the error messages irrespective of whether the vehicle is in the maintenance state; and
   performing, if the maintenance state has been detected by the sensor system, at least one of (i) automatically extending the admissible value range, and (ii) increasing an error latency time of at least one operating parameter.

2. The method of claim 1, wherein the maintenance state is detected with at least one of a wheel speed sensor, a gear position sensor, an ignition switch sensor, and an engine speed sensor.

3. The method of claim 2, wherein the vehicle system is a brake system of the vehicle, and wherein the at least one operating parameter is at least one of a brake pressure, a brake piston path, and a pump run time of a hydraulic pump.

4. The method of claim 1, wherein the vehicle system is a brake system of the vehicle, and wherein the at least one operating parameter is at least one of a brake pressure, a brake piston path, and a pump run time of a hydraulic pump.

5. The method of claim 1, wherein a threshold value which represents a limit of the value range is modified so that the value range is extended.

6. A control unit for avoiding error messages due to maintenance work on a vehicle, comprising:
   a sensor system that detects whether the vehicle is in a maintenance state, wherein a monitoring arrangement for monitoring a reliability performance of a vehicle system generates, irrespective of whether the vehicle is in the maintenance state, the error messages when one or multiple operating parameters of the vehicle system are outside a predefined admissible value range; and
   a control arrangement to perform, if the maintenance state has been detected by the sensor system, at least one of (i) automatically extending the admissible value range, and (ii) increasing an error latency time of at least one operating parameter.

7. The control unit of claim 6, wherein the maintenance state is detected with at least one of a wheel speed sensor, a gear position sensor, an ignition switch sensor, and an engine speed sensor.

8. The control unit of claim 7, wherein the vehicle system is a brake system of the vehicle, and wherein the at least one operating parameter is at least one of a brake pressure, a brake piston path, and a pump run time of a hydraulic pump.

9. The control unit of claim 6, wherein the vehicle system is a brake system of the vehicle, and wherein the at least one operating parameter is at least one of a brake pressure, a brake piston path, and a pump run time of a hydraulic pump.

10. The control unit of claim 6, wherein the control arrangement extends the admissible value range by modifying a threshold value which represents a limit of the admissible value range.

* * * * *